(12) United States Patent
Andrei et al.

(10) Patent No.: US 10,885,062 B2
(45) Date of Patent: Jan. 5, 2021

(54) PROVIDING DATABASE STORAGE TO FACILITATE THE AGING OF DATABASE-ACCESSIBLE DATA

(71) Applicant: SAP SE, Walldorf (DE)

(72) Inventors: Mihnea Andrei, Issy les Moulineaux (FR); Christian Bensberg, Heidelberg (DE); Alexander Boehm, Sandhausen (DE); Adrian Dragusanu, Walldorf (DE); Xun Chen, Walldorf (DE); Reza Sherkat, Ontario (CA); Anisoara Nica, Walldorf (DE); Martin Heidel, Walldorf (DE); Rolando Blanco, Ontario (CA)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 15/361,337

(22) Filed: Nov. 25, 2016

(65) Prior Publication Data

US 2017/0371909 A1    Dec. 28, 2017

Related U.S. Application Data

(60) Provisional application No. 62/354,057, filed on Jun. 23, 2016.

(51) Int. Cl.
*G06F 16/28* (2019.01)
*G06F 16/21* (2019.01)

(52) U.S. Cl.
CPC ............ *G06F 16/282* (2019.01); *G06F 16/21* (2019.01)

(58) Field of Classification Search
CPC ......... G06F 17/30589; G06F 17/30289; G06F 17/30598; G06F 17/30339; G06F 16/282; G06F 16/21
See application file for complete search history.

(56) References Cited

U.S. PATENT DOCUMENTS

| | | | | |
|---|---|---|---|---|
| 6,490,597 | B1 * | 12/2002 | Singh | G06F 17/30356 |
| 2014/0089257 | A1 * | 3/2014 | Ignacio | G06F 16/214 707/609 |
| 2014/0095547 | A1 * | 4/2014 | Guo | G06F 3/0649 707/792 |
| 2014/0195542 | A1 * | 7/2014 | Larson | G06F 16/24554 707/741 |
| 2014/0344234 | A1 * | 11/2014 | Amarendran | G06F 17/30289 707/694 |
| 2014/0365424 | A1 * | 12/2014 | Herbst | H04W 52/0209 707/607 |
| 2015/0095307 | A1 * | 4/2015 | Bensberg | G06F 16/185 707/714 |
| 2015/0324447 | A1 * | 11/2015 | Kim | G06F 16/22 707/737 |
| 2016/0092555 | A1 * | 3/2016 | Hegde | G06F 16/217 707/792 |
| 2017/0352038 | A1 * | 12/2017 | Parekh | G06Q 30/018 |

* cited by examiner

*Primary Examiner* — Robert W Beausoliel, Jr.
*Assistant Examiner* — Mohammad Solaiman Bhuyan
(74) *Attorney, Agent, or Firm* — Mintz Levin Cohn Ferris Glovsky and Popeo, P.C.

(57) ABSTRACT

Persisting data in logical tiers of an in-memory database based on aging rules of the database system. The database system can be configured to age data by moving the data from a first logical tier supporting high performance data access to a second logical tier supporting lower performance data access, thereby improving the operational efficiency of the database system.

13 Claims, 11 Drawing Sheets

PROVIDING DATABASE STORAGE TO FACILITATE THE AGING OF DATABASE-ACCESSIBLE DATA

CROSS-REFERENCE TO RELATED APPLICATIONS

This application claims priority to and the benefit of United States Provisional Patent Application No. 62/354,057, filed on Jun. 23, 2016, and entitled "Providing Database Storage to Facilitate the Aging and Archiving of Database-Accessible Data," the disclosure of which is incorporated herein in its entirety for all purposes.

TECHNICAL FIELD

The subject matter described herein relates to managing physical memory storage for the aging and archiving of data that maintains its accessibility to the database management system.

BACKGROUND

The demand for ad-hoc and real-time data used and/or analyzed by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Data can become less relevant and therefore accessed less by database applications. Data of lower relevance can take up valuable space in an in-memory database reducing the efficiency of the database system.

SUMMARY

In one aspect, a method is described that includes at least one or more of the following operations. A plurality of data items can be classified. The plurality of data items can be stored in a database management system. The classifying of the plurality of data items can comprise applying one or more classification rules to one or more content attributes of the data item. In some variations, the classifying can be performed by an application of the database management system.

A first data item, of the plurality of data items, can be assigned to a first logical tier of the database management system. The first logical tier can have one or more first logical tier attributes. The assigning of the first data item, of the plurality of data items, to the first logical tier can include determining, based on the classifying, that the content attributes of the first data item satisfy the first logical tier attributes.

In some variations, the first logical tier attributes can be such that they designate the first logical tier for storing data items that are classified as current. The second logical tier attributes can be such that they designate the second logical tier for storing data items that are classified as historical.

A second data item, of the plurality of data items, can be assigned to a second logical tier of the database management system. The second logical tier can have one or more second logical tier attributes. The database management system can have equal access to both the first logical tier and the second logical tier. The assigning of the second data item, of the plurality of data items, to the second logical tier can include determining, based on the classifying, that the content attributes of the second data item satisfy the second logical tier attributes.

Access to the plurality of data items can be controlled. The controlling of the access to the plurality of data items can be such, that data items assigned to the second logical tier are not accessed unless those data items assigned to the second logical tier will contribute to a result of a received query. Controlling access to the plurality of data items can include applying implicit and explicit access controls. The implicit access control can include evaluating a condition specified in the received query against a statistical description of the second logical tier such that the second logical tier is not accessed if the statistics indicate no relevant data in the second tier. The explicit access control can include the received query that can include a clause that requests only current data to be accessed.

In some variations, a first logical tier can be on a first node and the second logical tier can be on a second node. The first data item can be transferred to the second logical tier. The transferring can be performed when the classifying indicates that the one or more content attributes of the first data item now satisfy the one or more second logical tier attributes. The transferring of the first data item to the second logical tier can include transmitting the data item from the first node to the second node.

The first node can have a higher memory access rate compared to the second node. The second node can have a higher storage capacity at a smaller cost per storage volume than the first node. The first logical tier can be configured to have data items assigned to it that have a high level of relevance compared to the data items assigned to the second logical tier. The first logical tier can be stored on an in-memory storage medium and the second logical tier is stored on an on-disk storage medium.

The transferring of the first data item to the second logical tier can be performed when the classifying indicates that the one or more content attributes of the first data item now satisfy the one or more second logical tier attributes.

The first logical tier can be associated with a first partition. The transferring of the first data item, from the first logical tier to the second logical tier, can include moving at least the first data item from the first partition to a second partition. The second partition can be associated with the second logical tier.

The first logical tier can be associated with a first partition. The second partition can be associated with the second logical tier. The first logical tier can be transferred to the second logical tier when the classifying indicates that data items in the first partition now satisfy the one or more second logical tier attributes.

A classification can be applied to a data item stored in an in-memory database. The classification can be associated with one or more data item attributes of the data item. The data item can be assigned to a first logical tier. The first logical tier can have one or more first logical tier attributes that correspond to the one or more data item attributes. The data item can be transferred to the second logical tier. The data item can be transferred to a second logical tier in response to the data item satisfying one or more second logical tier attributes of the second logical tier.

In some variations, the method may optionally include one or more of the following operations and elements. The first logical tier can be on a first node and the second logical tier can be on a second node. Transferring of the data item to the second logical tier can include transmitting the data item from the first node to the second node.

The first node can have a higher memory access rate compared to the second node.

The one or more data item attributes can include, at least, an age of the data item, can be associated with a level of relevance of the data item, or the like. The first logical tier can be configured to have data items assigned to it that have a high level of relevance compared to the data items assigned to the second logical tier. In some variations, the first logical tier can be stored on an in-memory storage medium and the second logical tier can be stored on an on-disk storage medium.

The classification of the data item can be applied by an application of a database management system.

In some variations, the data item can be transferred to an archive in response to the classification of the data item indicating that the data item is an archived data item.

The first logical tier can be associated with a first partition. The transferring of the data item from the first logical tier to the second logical tier can include, at least, partitioning at least the data item from the first partition to a second partition. The second partition can be associated with the second logical tier.

The transferring of the data item to the second logical tier can include, at least, moving a partition, in which the data item is located, from a first node to a second node.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
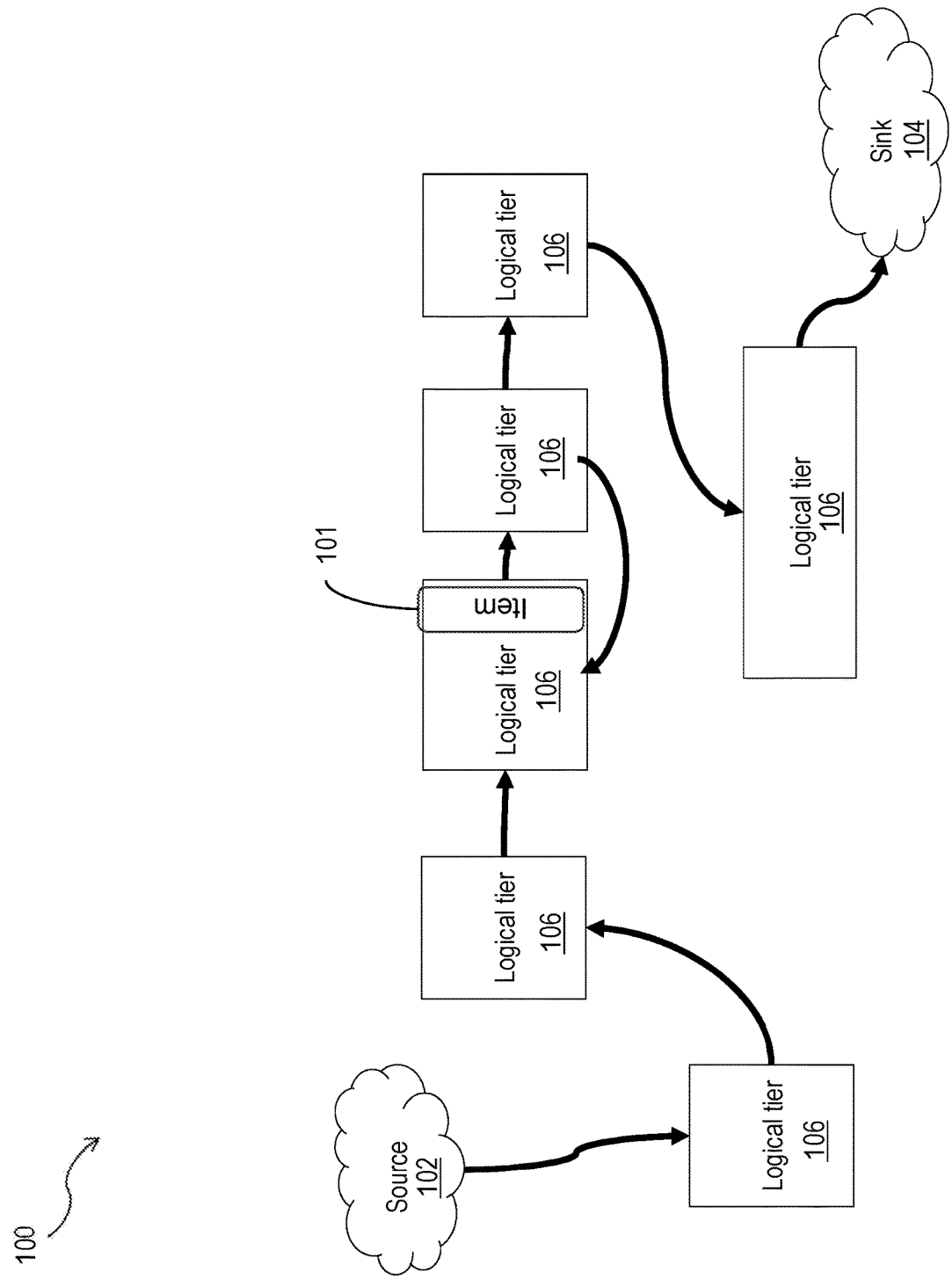
FIG. 1 is an illustration of a logical architecture of a database system having one or more features consistent with the present description.

Data maintained by a database management system can have a lifecycle. There are many forms of data lifecycles. For example, a data lifecycle can depend on an access pattern of the data by a database management system. This can be referred to as caching. When data is accessed frequently by a database management system, the data can be cached so that is easily accessible by the database management system. Another form of data lifecycle can be archiving. When data is no longer accessed by a database, the data can be archived. Archived data is typically stored on high-volume, low-speed access data media. For example, data can be archived onto on-disk memory, tape memory, or the like.

Another form of data lifecycle is aging. Aging can depend on database application rules. Database application aging rules may determine that data having a certain set of attributes need not be accessed, by database applications, as frequently as other data. Consequently, that data can be transitioned from a relatively high-cost, high-speed memory to a relatively low-cost, low-speed memory. This action can be referred to as aging data items. Transitioning data that has aged can include repartitioning at least a portion of a database to generate a partition that includes less relevant data according to the database application aging rules. The partition(s) having the less relevant data can be stored in a data store separately from other partitions having more relevant data.

Data can become more or less relevant based on the needs of the organization operating the database management system. Data will be typically aged in a linear manner. Historical data are generally less relevant than recent data to an organization that is operating the database system. When data is maintained by an in-memory database, less relevant data can take up valuable space in the in-memory database that could be used by more relevant data. The presently described subject matter can be configured to age data based on one or more database application aging rules. An example of a database application aging rule can include an aging rule that causes an invoice to age in response to the paid date of the invoice being older than two years. When a data item representing an invoice gets older than two years, the data item can be aged by transferring the data item from a high-performance memory storage to a lower-performance memory storage.

Aging can have a coarser time granularity compared to caching. Aging can typically be based on quarters, years, or the like. Caching can be based on seconds, minutes, hours, or the like. In some variations, aging can be performed periodically. For example, at the end of a quarter, or a year, one or more database application aging rules can be implemented to cause data to age.

Aging of data causes the data to be maintained in the operational database system after aging of the data. Conversely, archiving data will typically put the data outside of the operational database system.

Data items can be stored in logical tiers, for example such that each logical tier has one or more attributes conducive to storing the type of data items in it. Current data can be stored on a logical tier associated with a high-performance memory, allowing queries to be run on the current data. Historical data can be stored on logical tiers associated with a lower-performance memory, storing less frequently accessed data with greater economy. When current data becomes historical data, the data can be aged from the first logical tier to another logical tier associated with historical data. Aging of data can cause the data to move from one aging tier to the next. For example, one aging tier may comprise data that has a close-out date of greater or equal to two years. Another aging tier may comprise data that has a close-out date of greater or equal to five years. A further aging tier may comprise data that has a close-out date of greater or equal to ten years.

Different aging tiers can be on separate logical tiers. Data can be aged from one logical tier to the next when database application aging rules dictate the aging of the data. In some variations, different logical tiers may be stored in different memory stores. The different memory stores may be located at different nodes of a database system. Data that is current data and which needs to be readily available may be stored on a data store that allows efficient access of the data. For example, such a data store may be an in-memory data store that includes very high-speed memory and is physically located near the location at which the data is used. Data that has been aged and is accessed less frequently may be stored on a data store that allows for lower efficiency of data access. Such a data store may include relatively slower memory and/or may be physically located a further distance from the location at which the data is used compared to the current data store. Such memory stores are typically cheaper to buy and operate than faster data stores used to store data items in the first logical tier.

When data is to be aged from one tier to the next and different tiers are stored in different data stores, the database management system may wait until there is a threshold amount of data prior to transferring the data from one data store to the next. Transferring data from one data store to another is resource intensive. Moving large amounts of data between data stores is more efficient than moving the data items individually. Furthermore, by waiting to transfer data, the transfer can be scheduled for a time when the database system is unburdened by users, for example, when users are typically off-line (or at least fewer users are online), such as at night, on weekends, etc.

In some variations, aging data can include partitioning a table, or partitioning an existing partition of a table, with the partitioning criteria conforming to one or more database application rules that dictate how data is aged. The database management system may have a partition that contains current data. Aging rules can cause the current data partition to be partitioned so that data that is to be aged is removed from the current data partition. The aged data can be transferred to another partition, which can be an existing petition or a new partition. In a scaleout database system, the partition having the aged data can be on a node that is different from the node on which the current data partition is maintained. In some variations, a partition of aged data can be formed on, say, a master node, and transferred to another node at a later time.

Having operationally relevant or current data on a node that is dedicated to processing queries on the operational, or current, data provides computational efficiencies. Computational efficiencies can be realized by having all current data on the same node allowing quick and efficient processing of queries related to the current operational data of an organization associated with the database management system After data has been properly aged, sometimes through many aging tiers, the data can be archived. Archiving of data can include moving data from a relatively easily accessible data medium to a relatively inaccessible data medium. Relatively inaccessible data media tend to be less expensive and are capable of storing massive amounts of data. Such media can include tape drives, on-disk memory, or the like.

To have an efficient database management system, the data on different logical tiers, i.e., data that has different levels of aging, needs to be available seamlessly to the database management system, a database application and/or a user of the database management system. For example, when a query is run that requires access to data that has been moved to a logical tier that contains data accessed less frequently than other logical tiers, the query cannot fail due to the data being moved to a less frequently accessed logical tier.

FIG. 1 is an illustration of a logical architecture 100 of a database system having one or more features consistent with the present description. A database can be configured to maintain data items. A data item can be persisted in one or more database tables. A simple data item can be persisted in a single table whereas a data item having higher cardinality components can be persisted across multiple database tables.

Data items 101 can enter a database system from one or more sources 102. The data items 101 can leave a database system through one or more sinks 104. At any point in time, a data item 101 can be classified from the perspective of its current data lifecycle state to belong to one of a plurality of logical tiers 106. All components of a data item 101 will belong to one logical tier at any given time. The data item 101 can be the smallest granularity of data lifecycle. The classification of the data item 101 to a logical tier 106 can be based on the state of the data item 101. This is because the state of the data item 101 captures the application logic that is using the data item 101.

As time goes by, and the application using the data item 101 changes the state of the data item 101, the classification of the data item 101 can change and there its logical tier can also change. The data item 101 can be reclassified so that it is assigned to a different logical tier 106. In some variations, the application using the data item 101 may require transparent access to all data items within a data set, independently of the logical tier 106 to which those data items are assigned. In some variations, the application using the data item 101 may need to limit the access of the application to a subset of logical tiers 106. For example, when accessing data associated with a current financial quarter, there is no need to access historical data that is unrelated to the current financial quarter. Similarly, when accessing data, for say, an audit associated with events two years ago, there is no need to access current data. Where current data and historical data are stored on separate logical tiers and/or separate nodes, the database system and/or database applications can be configured to only access the logical tiers and/or nodes that contain the data required to complete their tasks.

An application using a data item 101 can change the structure of the data item. A data lifecycle related structural change can include aging by the application and can result in the reclassification of the data item 101 in a new logical tier 106 whose persistence tables have different schemas. When uniform access to the logical tiers 106 is needed, the invariants across such structural changes can be exploited to create union views offering uniform access to their underlying heterogeneous tables. This can provide heterogeneous layers.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

Figure 2:
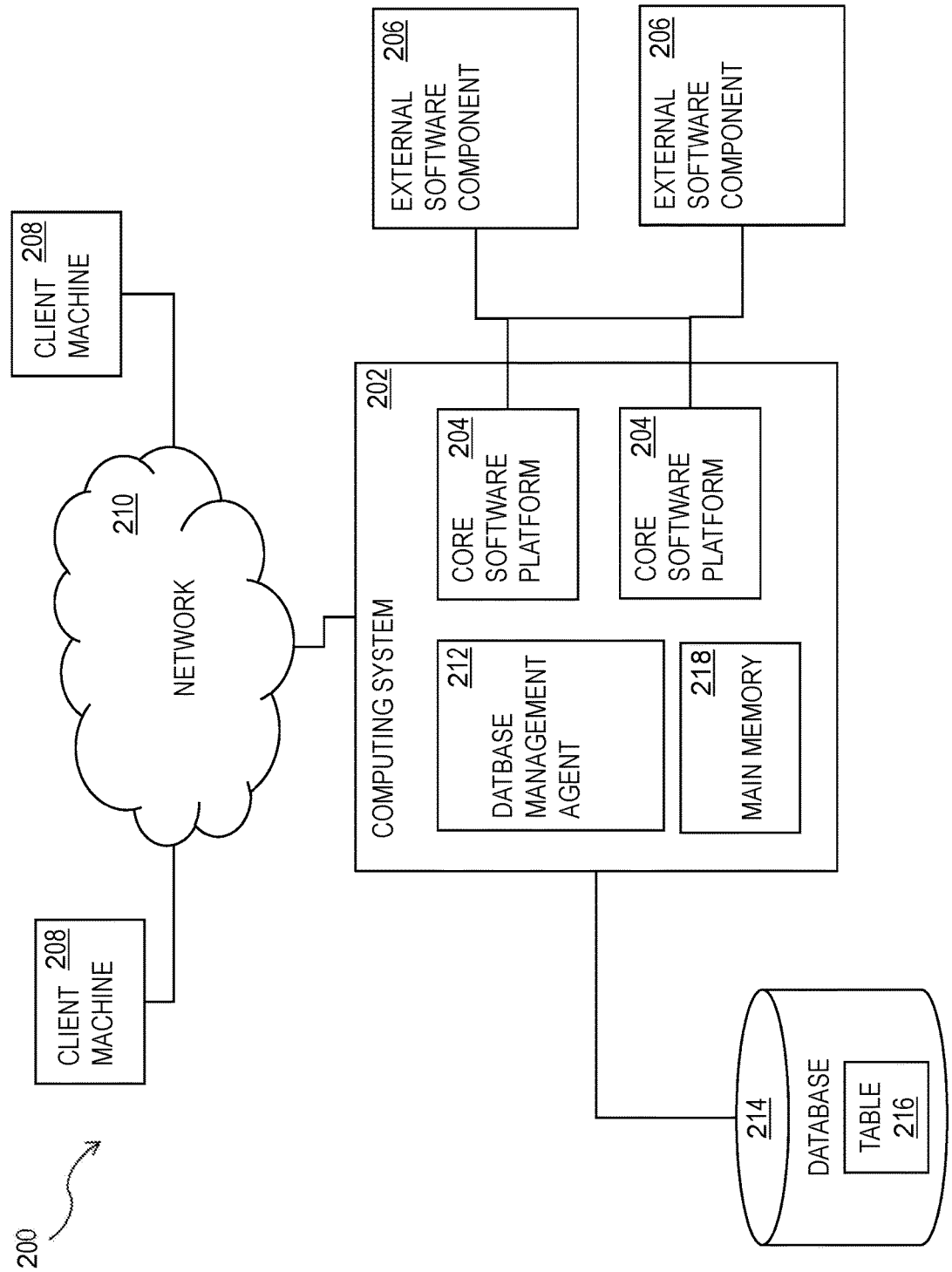
FIG. 2 is a diagram of a system that can implement one or more features consistent with the present description.

FIG. 2 shows a diagram of a system 200 that can implement one or more features of the current subject matter. A computing system 202 can include one or more core software platform modules 204 providing one or more features of a business software system or other software that includes database management features. The computing system can also aggregate or otherwise provide a gateway via which users can access functionality provided by one or more external software components 206. One or more client machines 208 can access the computing system, either via a direct connection, a local terminal, or over a network 210 (e.g. a local area network, a wide area network, a wireless network, the Internet, or the like). The one or more core software platforms 204, external software components 206, or the like, can include data item aging rules.

A database management agent 212 or other comparable functionality can access a database 214 that includes at least one table 216, which can in turn include at least one column. The database management agent 212 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like. The data can lose relevance to an organization over time. Data that is less relevant can be stored on different logical tiers compared to data is more relevant to an organization. This can improve operational efficiencies of the database system by avoiding active high-speed nodes being occupied by non-relevant data.

The database management agent 212 or other comparable functionality can be configured to load a database table 216, or other comparable data set, into the main memory 218. The database management agent 212 can be configured to load the information from the database 214 to the main memory 218 in response to receipt of a query instantiated by a user or computer system through one or more client machines 208, external software components 206, core software platforms 204, or the like.

Figure 3:
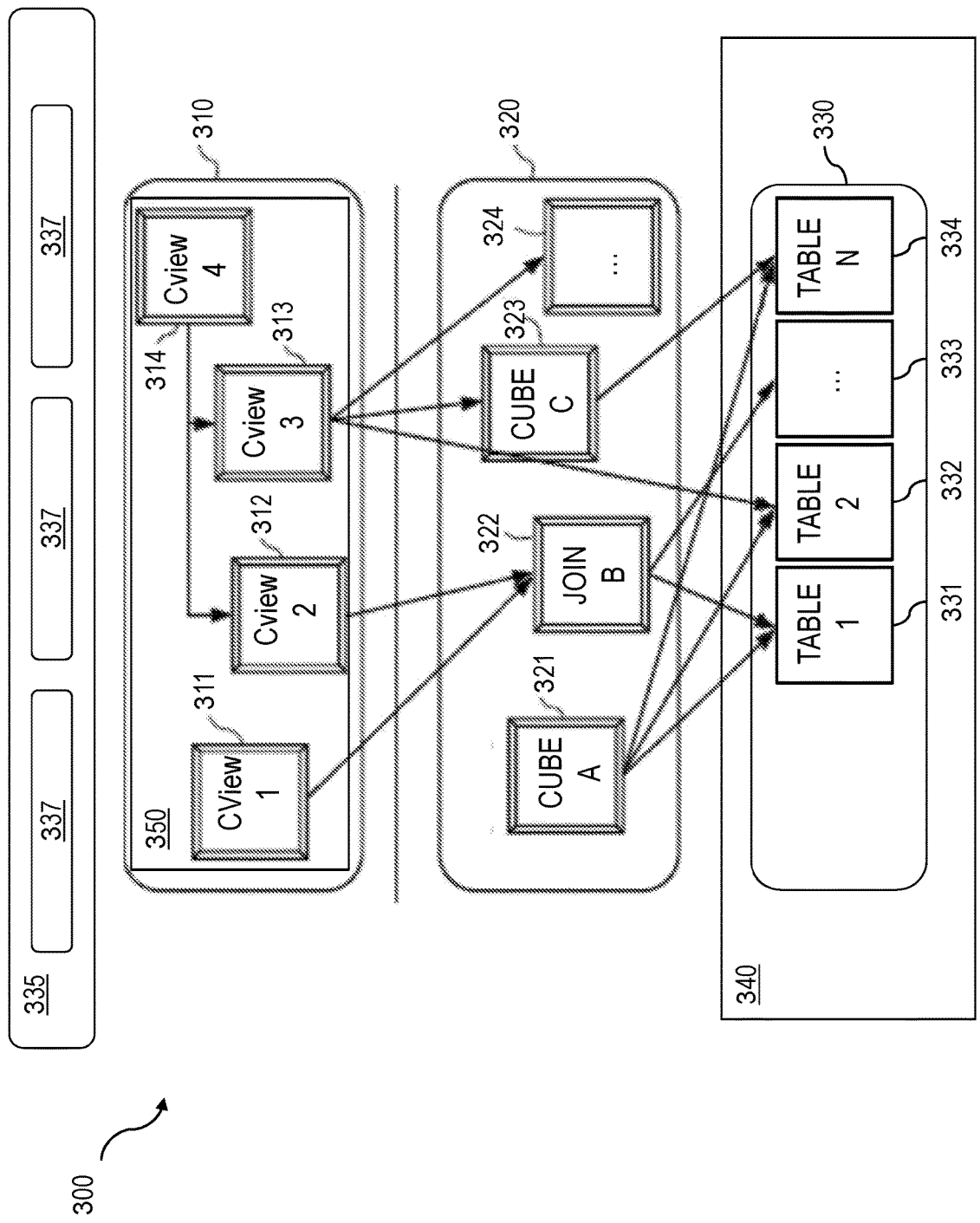
FIG. 3 is a diagram that illustrates a computing architecture having one or more features consistent with the present description.
Figure 4:
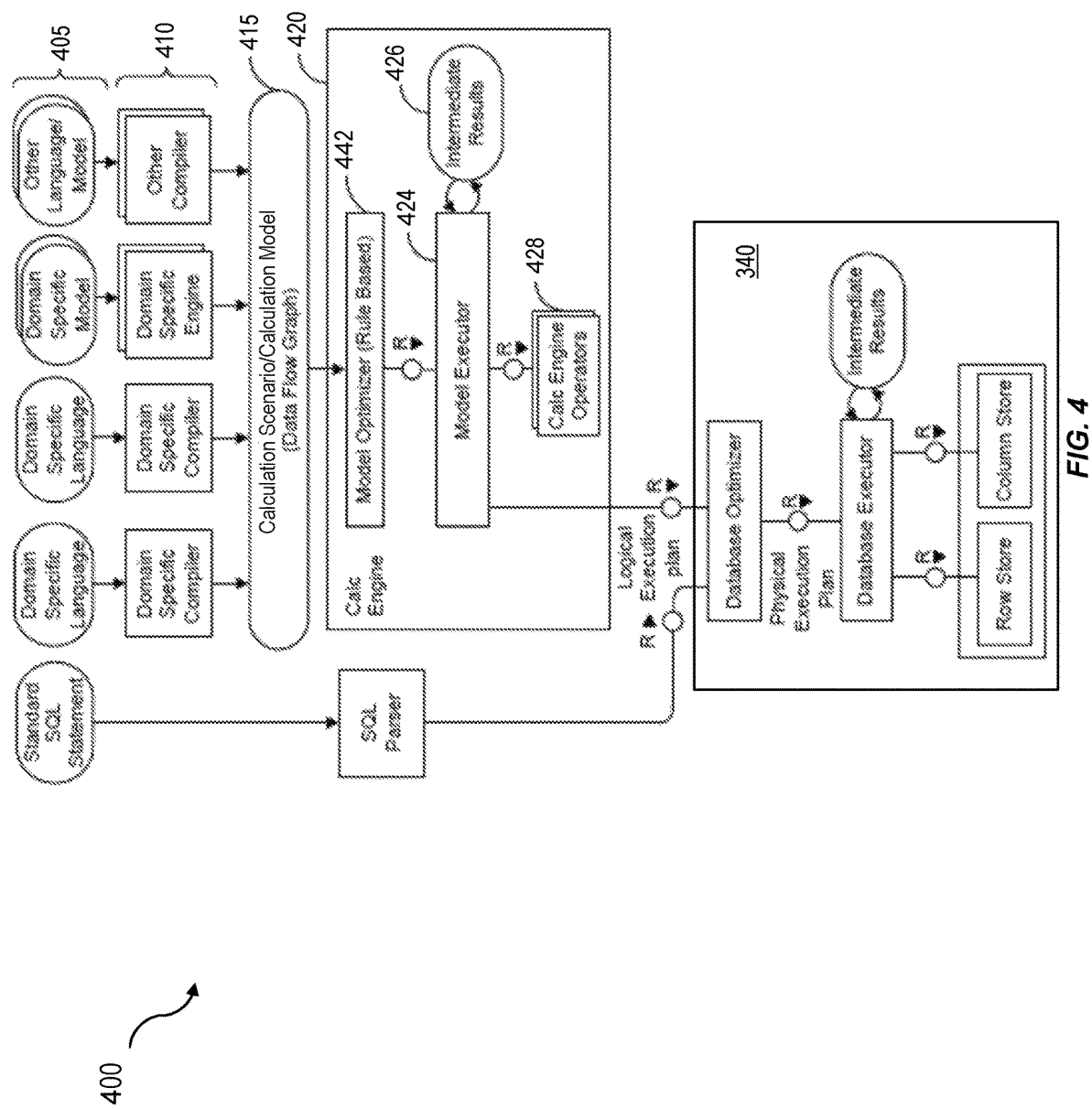
FIG. 4 is a diagram illustrating a sample architecture for request processing and execution control, the sample architecture having one or more features consistent with the present description.

FIG. 3 is a diagram that illustrates a computing architecture 300 including a database system that includes three layers: a top layer, calculation engine layer 310, an intermediate layer, or logical layer 320, and a top layer, or physical table-pool 330. One or more application servers 335 implementing database client applications 337 can access the database system 400, as shown in FIG. 4. Calculation scenarios can be executed by a calculation engine, which can form part of a database or which can be part of the calculation engine layer 310 (which is associated with the database). The calculation engine layer 310 can be based on and/or interact with the other two layers, the logical layer 320 and the physical table pool 330. In some variations, the physical table pool 330 can comprise database operations configured to access and perform the database operations on the individual tables. In some variations, the basis of the physical table pool 330 consists of physical tables (called indexes) containing the data, which can be stored on one more database servers 340. Various tables 331-334 can be joined using logical metamodels 321-324 defined by the logical layer 320 to form an index. For example, the tables 331-334 in a cube (e.g. an online analytical processing or "OLAP" index) can be assigned roles (e.g., fact or dimension tables) and joined to form a star schema. It is also possible to form join indexes (e.g. join index B 322 in FIG. 3), which can act like database views in computing environments such as the Fast Search Infrastructure (FSI) available from SAP SE of Walldorf, Germany.

A calculation scenario 350 can include individual nodes (e.g. calculation nodes) 311-314, which in turn can each define operations such as joining various physical or logical indexes and other calculation nodes (e.g., CView 4 is a join of CView 2 and CView 3). That is, the input for a node 311-314 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 350, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 350 can be created which can be reused by multiple queries even if such queries do not require every attribute specified by the calculation scenario 450. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 350 can be uniquely identifiable by a name (e.g., the calculation scenario 350 can be a database object with a unique identifier, etc.). Accordingly, the calculation scenario 350 can be queried in a manner similar to a view in a SQL database. Thus, the query is forwarded to the calculation node 311-314 for the calculation scenario 350 that is marked as the corresponding default node. In addition, a query can be executed on a particular calculation node 311-314 (as specified in the query). Furthermore, nested calculation scenarios can be generated in which one calculation scenario 350 is used as source in another calculation scenario (e.g. via a calculation node 311-314 in this calculation scenario 350). Each calculation node 311-314 can have one or more output tables. One output table can be consumed by several calculation nodes 311-314.

FIG. 4 is a diagram 400 illustrating a sample architecture for request processing and execution control. As shown in FIG. 4, artifacts 400 in different domain specific languages 405 can be translated by their specific compilers 410 into a common representation called a "calculation scenario" 350 (which is also referred to in FIG. 4 as a calculation model). To achieve enhanced performance, the models and programs written in these languages are executed inside the database server 340. This arrangement eliminates the need to transfer large amounts of data between the database server 340 and a client application 337, which can be executed by an application server 335. Once the different artifacts 400 are compiled into this calculation scenario 415, they can be processed and executed in the same manner. A calculation engine 420 executes the calculation scenarios 415.

A calculation scenario 415 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 337 at the application server 335). Inputs can be connected to tables or to the outputs of other nodes. A calculation scenario 415 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 415 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 415 can be defined as part of database metadata and invoked multiple times. A calculation scenario 415 can be created, for example, by a SQL statement "CREATE CALCULATION SCENARIO <NAME> USING <XML or JSON>". Once a calculation scenario 815 is created, it can be queried (e.g., "SELECT A, B, C FROM <scenario name>", etc.). In some cases, databases can have pre-defined calculation scenarios 415 (default, previously defined by users, etc.). Calculation scenarios 415 can be persisted in a repository (coupled to the database server 340) or in transient scenarios. Calculation scenarios 415 can also be kept in-memory.

Calculation scenarios 415 are more powerful than traditional SQL queries or SQL views for many reasons. One reason is the possibility to define parameterized calculation schemas that are specialized when the actual query is issued. Unlike a SQL view, a calculation scenario 415 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 415 may contain an aggregation node containing all attributes. Later, the attributes for grouping can be supplied with the query. This allows having a predefined generic aggregation, with the actual aggregation dimensions supplied at invocation time. The calculation engine 420 can use the actual parameters, attribute list, grouping attributes, and the like supplied with the invocation to instantiate a query specific calculation scenario 415. This instantiated calculation scenario 415 is optimized for the actual query and does not contain attributes, nodes or data flows that are not needed for the specific invocation.

When the calculation engine 420 gets a request to execute a calculation scenario 415, it can first optimize the calculation scenario 415 using a rule based model optimizer 422. Examples for optimizations performed by the model optimizer can include "pushing down" filters and projections so that intermediate results 426 are narrowed down earlier, or the combination of multiple aggregation and join operations into one node. The optimized model can then be executed by a calculation engine model executor 424 (a similar or the same model executor can be used by the database directly in some cases). This includes decisions about parallel execution of operations in the calculation scenario 415. The model executor 424 can invoke the required operators (using, for example, a calculation engine operators module 428) and manage intermediate results. Most of the operators are executed directly in the calculation engine 420 (e.g., creating the union of several intermediate results). The remaining nodes of the calculation scenario 415 (not implemented in the calculation engine 420) can be transformed by the model executor 424 into a set of logical database execution plans. Multiple set operation nodes can be combined into one logical database execution plan if possible.

The calculation scenarios 415 of the calculation engine 420 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 420 to execute the calculation scenario 815 behind the calculation view. In some implementations, the calculation engine 420 and the SQL processor are calling each other: on one hand the calculation engine 420 invokes the SQL processor for executing set operations and SQL nodes and, on the other hand, the SQL processor invokes the calculation engine 420 when executing SQL queries with calculation views.

The model optimizer 422 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 422 can additionally or alternatively be based on an estimated and/or actual amount of memory consumed by the dataset, a number of rows and/or columns in the dataset, and the number of cell values for the dataset, and the like.

A calculation scenario 415 as described herein can include a type of node referred to herein as a semantic node (or sometimes semantic root node). A database modeler can flag the root node (output) in a graphical calculation view to which the queries of the database applications directed as semantic node. This arrangement allows the calculation engine 420 to easily identify those queries and to thereby provide a proper handling of the query in all cases.

To process queries submitted through the calculation engine layer 310 using a calculation scenarios 350, the physical layer 330 may be required to load one or more tables 331-334 into the main memory 218 of the computing system 202. There may be occasion where there is insufficient capacity to load one of the tables, in its entirety, into the memory. Not having the whole table in the main memory 218 can create a situation here the computing system 202 has to continually communicate with disk memory on which a copy of the table may be stored. This increases the processing time of the executed calculation scenario 350.

Similarly, the calculation nodes 311-314 may include one or more constraints that narrow the part of the table that needs to be processed. The constraints may result in a subset of the rows of a table that require processing. Consequently, there would be no need to load every row of the table into the main memory 218 of the computing system 202.

Figure 5:
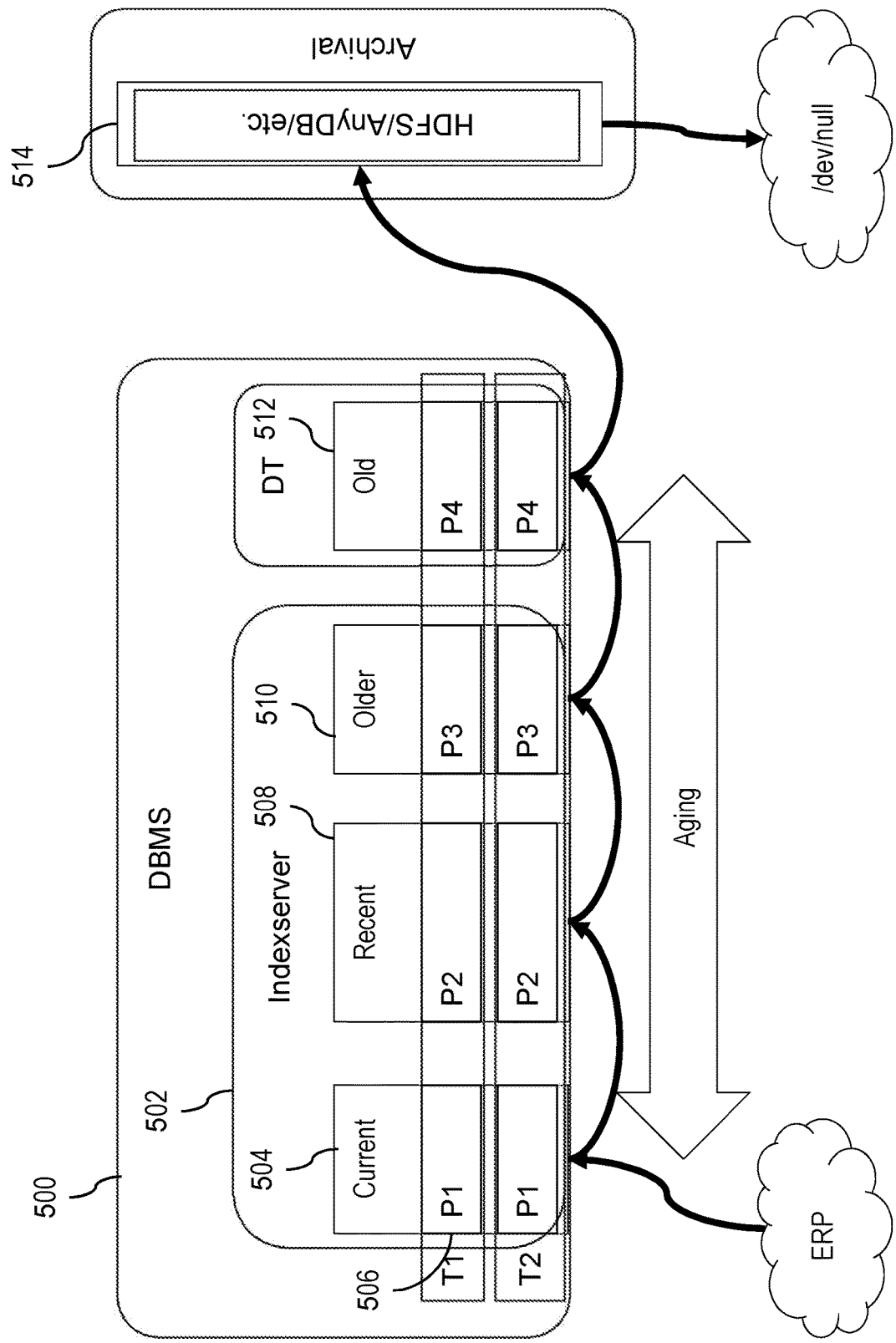
FIG. 5 is an illustration of a data item aging in a database system, having one or more features consistent with the present description.

FIG. 5 is an illustration of a data item aging in a database system 500, having one or more features consistent with the present description. Aging is a linear form of data lifecycle because it is correlated with time. In one variation, data items 101, illustrated in FIG. 1, can start by having a high level of relevance. New data items, having just been created, are likely to be highly relevant to the current operations of an organization operating the database system 500. When archived the data items 101 may no longer be seamlessly accessible by the data. As time passes, the data items 101 can become less relevant to the current operations of the enterprise and can therefore be aged. Eventually, the data items 101 can be archived base system 500.

An indexserver 502 can be configured to assign the data item 101 to a first logical tier 504. The indexserver 502 can be configured to assign the data item 101 based on a classification of the data item 101 assigned by one or more database applications. The indexserver 502 can be an in-memory database and/or configured to manage an in-memory database. Data items persisted in a first logical tier 504 can be current, or have a high level of relevancy. The data items 101 can be persisted within partitions 506 within the logical tiers. Applications running on the database system 500 can be configured to age data items 101. The applications can include one or more data aging rules. The one or more data aging rules can dictate when data items 101 are aged into a logical tier of lower relevancy. In some variations, aging rules can be executed continuously. In other variations, aging rules can be executed periodically, for example, at the end of a quarter, a fiscal year, a calendar year, or the like.

The in-memory database system 502, or indexserver, can include a plurality of logical tiers. The plurality of logical tiers can support different performance requirements of applications interacting with data managed by the in-memory database 502.

The first logical tier 504 can be configured to support the high performance requirements of a database application. Historical logical tiers can be configured to support the storage of data items access less frequently and therefore require lower-performance.

In response the data item 101 satisfying an aging rule, the index server 502 can be configured to move the data item 101 from the first logical tier 504 to a second logical tier 508. The second logical tier 508 can be configured to store data that has less relevance than the first logical tier 504. In some variations, the second logical tier 508 can be in a data store having one or more characteristics suited to storing data that is less relevant that the data stored in the first logical tier 504. Such characteristics can include the second logical tier having an ability to store large amounts of data at a cost cheaper than the cost associated with the first logical tier 504. Similarly, the same or additional aging rules can age a data item 101 in a second logical tier 508 and cause the data item 101 to be transferred to a third logical tier 510. The third logical tier 510 can be configured to have characteristics allowing it to store data that is accessed less frequently and is less relevant than the data stored in the second logical tier 508.

In one exemplary variation, the data item may be passed down the chain of logical tiers as the data becomes less relevant to the operational activities of the database. In other variations, the data item may skip one or more of the logical tiers in response an aging rule dictating that the data is to be stored in a particular logical tier.

In some variations, the aging rules, dictated by a database application, may cause all, or substantially all, of the data in a partition, such as a partition 506 at the first logical tier 504, to be aged. When all, or substantially all, of the data in a partition is aged the entire partition may be moved from one logical tier to another logical tier. For example, partition 506 may be moved from the first logical tier 504 to the second logical tier 508.

Database applications may characterize a data item as having a low level of relevance, such that the aging rules dictate that the data item is to be stored on disk memory 512. The disk memory 512 can support partitioning and support access to the data, but with lower data access performance compared to the memory that stores the data items in the first logical tier 504.

Eventually, data items may become archivable data items. Such data items may still need to be accessed from time to time so they need to be preserved, but they might be accessed so infrequently that they can be stored in high data volume, low performance, storage devices. Such data items may be stored in a data archive 514. Archived data items are no longer in the operational database. For a database application to access archived data, the database application will have to include code to access the archived data items. Conversely, when a data item has been aged it is still in the operational database system and still accessible to database applications.

The database management system 500 that supports aging can provide uniform access (the application logic stays unchanged) while providing optimum performance and reduced memory footprint (historical data not being accessed when it's not needed by the application). When a structural change in the data is required, the database management system 500 that supports aging delimits different aging segments.

In some variations, the database management system 500 has no sink. In other words, the data items 101 never leave the database management system 500. The data items 101 remain in the on-disk database 512. In other variations, the database management system 500 can have a sink. A sink of a database can be, for example, an archive 514.

In some variations, a data lifecycle for a database management system 500 may need to be visible to an application's data model. This is necessary when, as part of a data lifecycle, the structure of the data items are changed, when the application needs explicit access to items in specific phases of their lifecycle, or the like. In some variations, a data lifecycle can be transparent to an application's logic. This can occur, for example, when the data items have a uniform structure throughout their lifecycle, or when the application is unconcerned with where the data items are stored, when the application accesses data items in a flat manner, where the application accesses only the physical tiers which contribute to the desired results, or the like.

In some variations, applications running on a database management system can be limited to access only the physical tiers which contribute to the desired results. This limiting can be achieved using dynamic partition elimination. For example, based on a WHERE clause of a query generated by the application logic, the database management system can be configured to deduce a priori whether the partition contributes to the results or not. If a partition does not contribute to the results of a query, that partition is not accessed by the database management system.

As an example, a query may include an explicit instruction to only access relevant data. Consequently, the database management system can be configured to only access logical tiers that contain relevant data. Oftentimes, a query will include an implicit instruction to access a subset of data. For example, a query may include an instruction to only access data related to a particular event. That event may have occurred recently and therefore all the data relevant to that event, and therefore, relevant to the query, may be in a logical tier having the relevant data. Consequently, the database management system can be limited to only accessing the logical tier associated with relevant data for that particular query.

Similarly, the query may include an indication that only year-end numbers are being accessed. The time when this query is run may mean that year-end numbers are only stored in logical tiers containing historical data items. For such a query, the database management system can be configured to limit the access to historical data logical tiers. Thereby reducing the processing overhead associated with accessing a relevant data logical tier and receiving no data in return.

Figure 6:
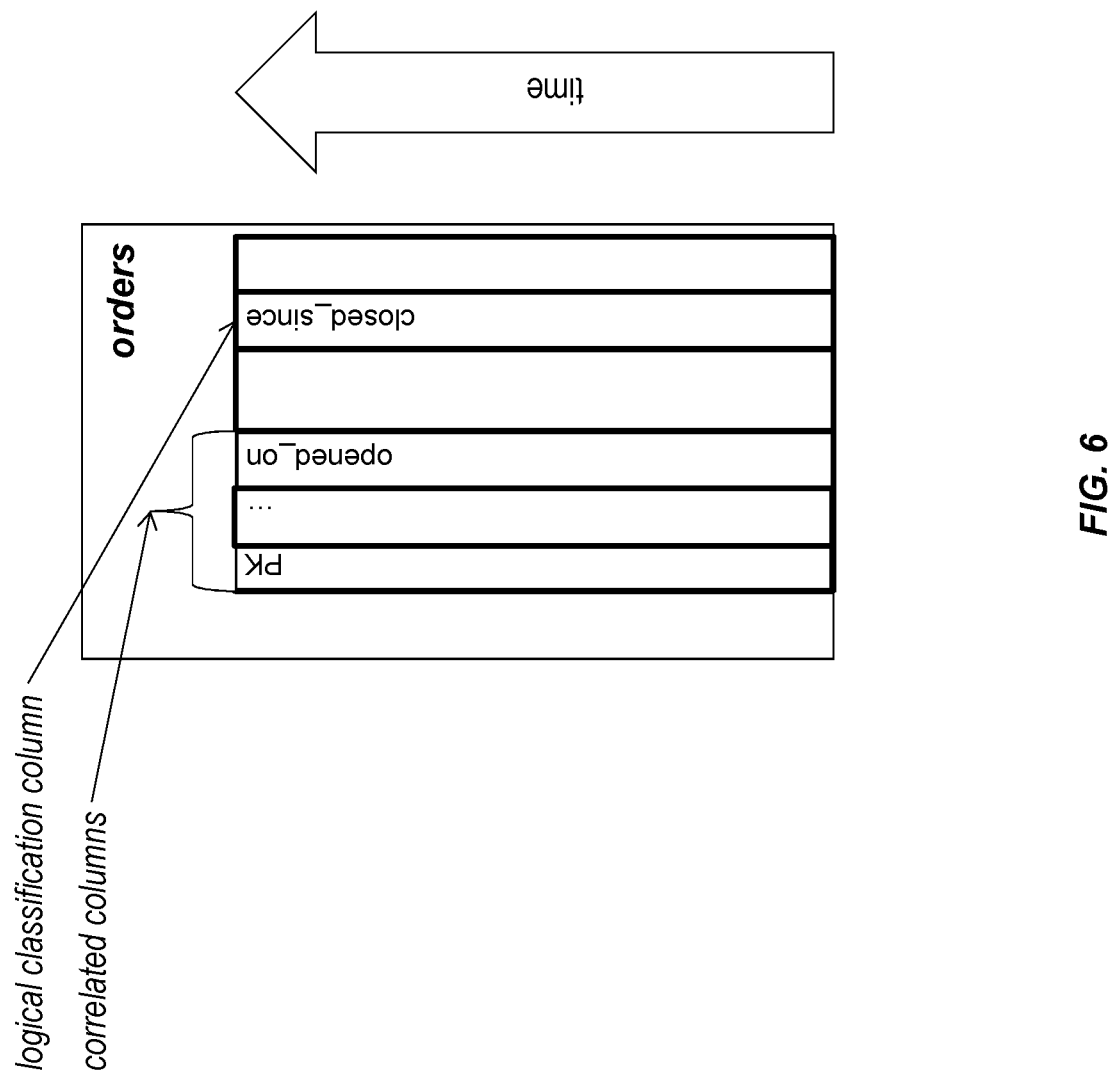
FIG. 6 is an illustration of an application's time correlated columns for use with a database system having one or more features consistent with the present description.

In some variations, each partition of a database table has a partition key which is an extension of an application data model, which in general is not an application relevant column. Consequently, the partition key will not be included in the application's WHERE predicates and partition elimination may be ineffective. However, the partition keys can generally be the same value as the classification column, which, for an aging data set, is time correlated. Other columns may be naturally time correlated, for example, order creation dates, order close dates, or the like. FIG. 6 is an illustration of an application's time correlated columns.

Figure 7:
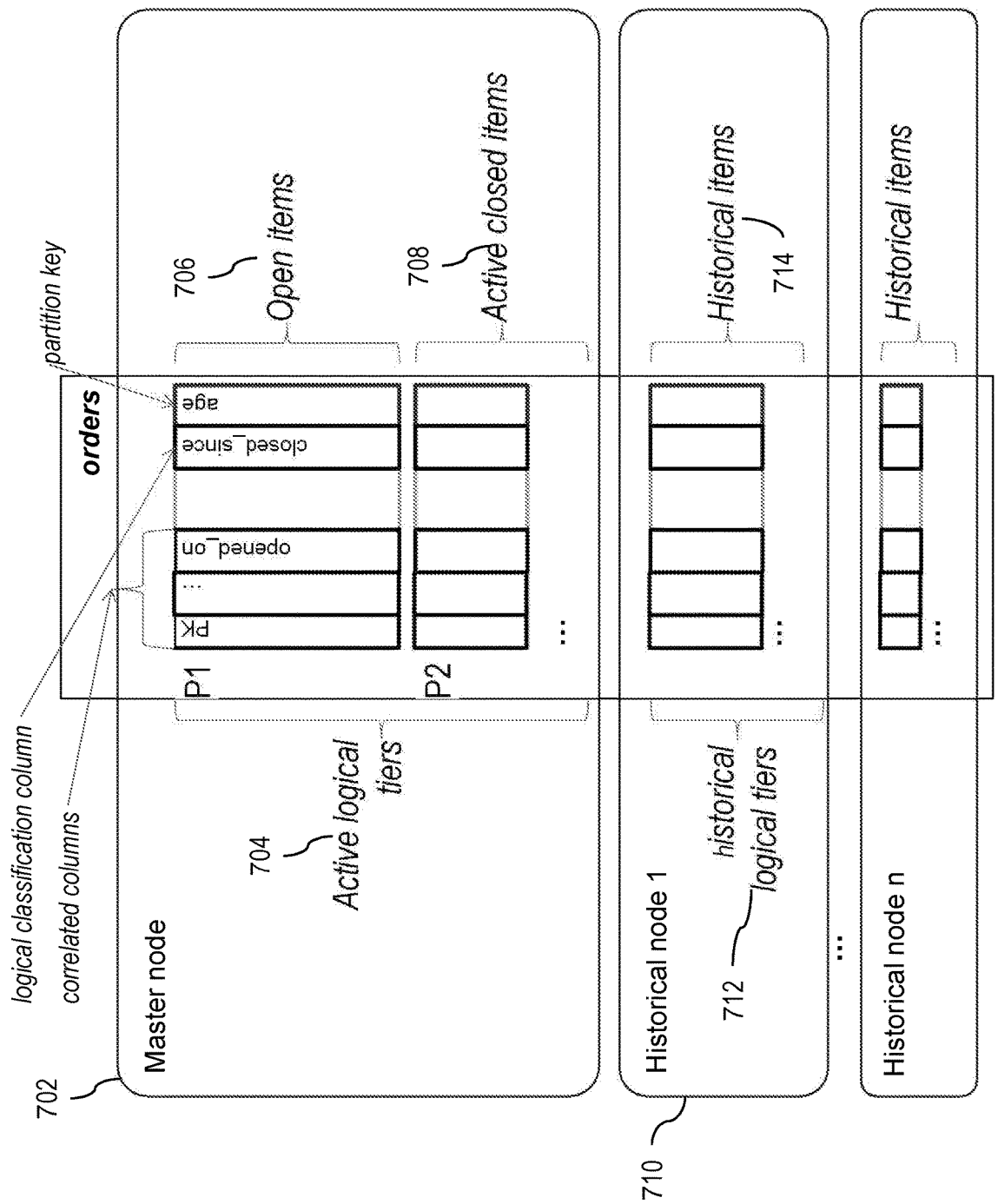
FIG. 7 is an illustration of a database management system's aging of partitions and nodes, the database management system having one or more features consistent with the present description.

To preserve application transparency to the database management system aging process, while facilitating the use of dynamic partition elimination, the naturally time correlated columns of the application can be declared to the database management system. As previously described, the database management system can be configured to partition a dataset and place the partitions on different nodes. FIG. 7 is an illustration of aging in a database management system having multiple nodes.

A master node 702 can include one or more active logical tiers 704. The one or more active logical tiers 704 can include multiple data partitions. For example, the partitions in the one or more active logical tiers 704 can include an open items partition 706 and an active closed items partition 708. A historical node 710 can be provided that includes one or more historical logical tiers 712. The one or more historical logical tiers 712 can include a historical item partition 714. In some variations, there can be a plurality of historical nodes.

The one or more historical logical tiers 712 can include one or more historical data partitions 714 that include aged data. The data in the one or more historical data partitions 714 can be aged using one or more aging rules of one or more applications implemented on a database management system. In some variations, individual data items can be transferred from a partition stored on the master node 702 to a partition stored on a historical node 710. In some variations, an entire partition may be transferred from the master node 702 to a historical node 710 in response to the partition satisfying one or more aging rules.

As an example, a data item in partition 706 can be an active data item. An active data item can be a data item that is not currently subject to any aging criteria dictated by one or more aging rules of an application of the database management system. At some point in time the data item in the partition 706 may become closed. A closed data item can be a data item associated with a task or an action that has been completed in the recent past. In some variations, the data item can be transferred from an open items partition 706 to an active and closed items partition 708. An active and closed items partition 708 can include data items that are still actively accessed by database applications but that are associated with a completed event or task. For example, accounting records may be closed, such as an invoice being paid, or the like, but may be active until the payment of the invoice has accrued, or been accounted for at the end of the month, end of the quarter or end of the year, or the like. Such a data item may remain active and closed until it is aged at the end of the month, quarter or year, or the like.

Generating an active and closed data item partition 408 on the master node allows for quick generation of such a partition due to the partitioning occurring locally on the same node. There is no requirement to connect with other nodes or transmit data to and/or receive data from other nodes when generating the active and closed data item partition 708.

In response to aging rules, which can be dictated by database applications, the data items can be aged. When there is an active and closed item partition 708 on the master node, the aging rules may cause the entire partition to be transferred to a historical node 710. Transferring an entire partition is, overall, less computer-resource intensive compared to moving each data item individually. Providing an active and closed item partition 708 can allow for a critical mass of aged data items to be generated before transferring them from a master node 702 to a historical node 710.

Figure 8:
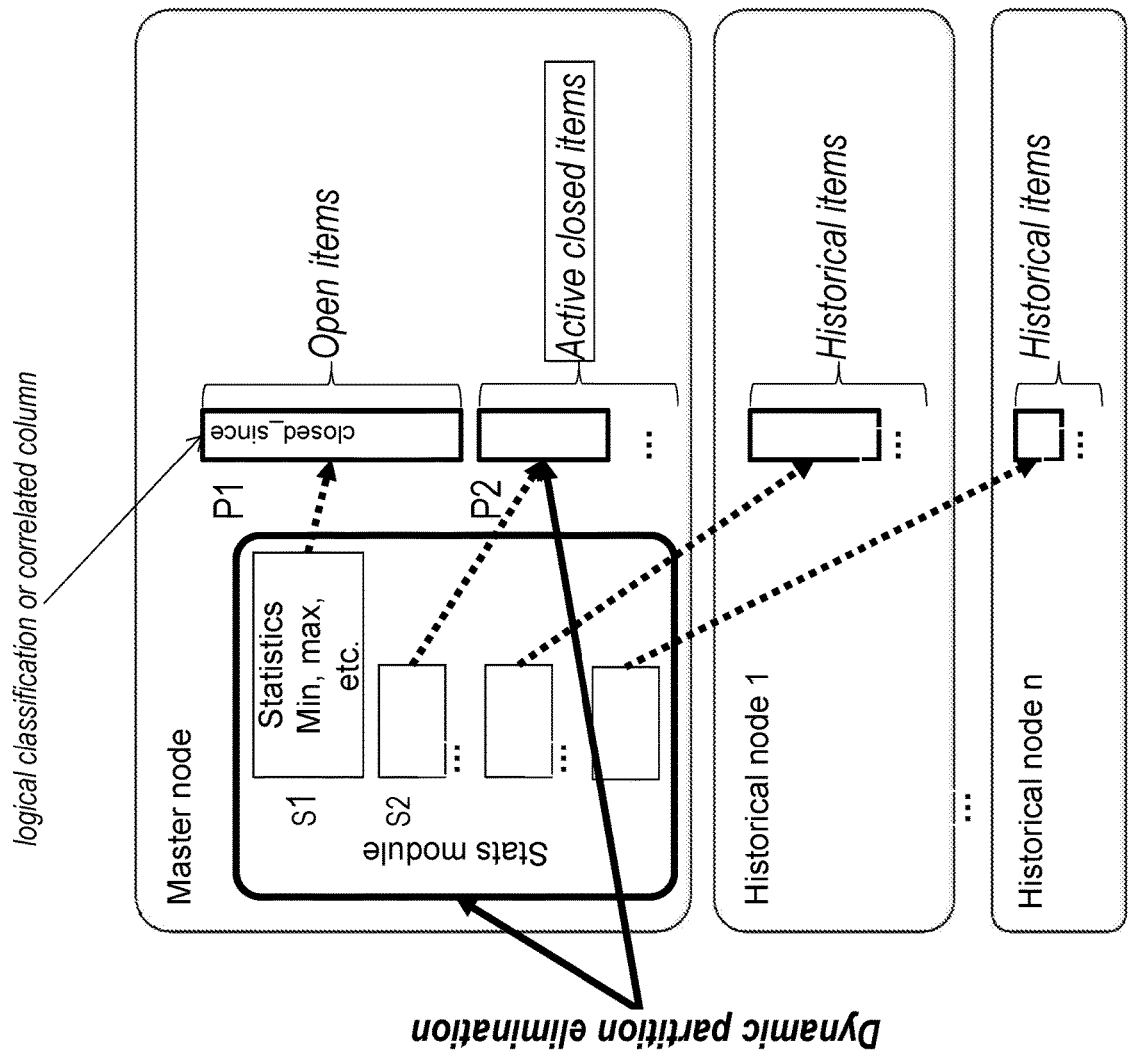
FIG. 8 is a schematic illustration of stored statistics that are based on partition elimination in a database management system having one or more features consistent with the present description.

FIG. 8 is a schematic illustration of partition elimination based on stored statistics. The database management system 500, illustrated in FIG. 5, can be configured to maintain partition statistics for all declared time correlated columns. FIG. 8 schematically illustrates the database management system maintaining the partition statistics. The database management system 500 can be configured, based on the partition statistics for all declared time correlated columns, to eliminate partitions that do not contain rows that are relevant for the result set.

Figure 9:
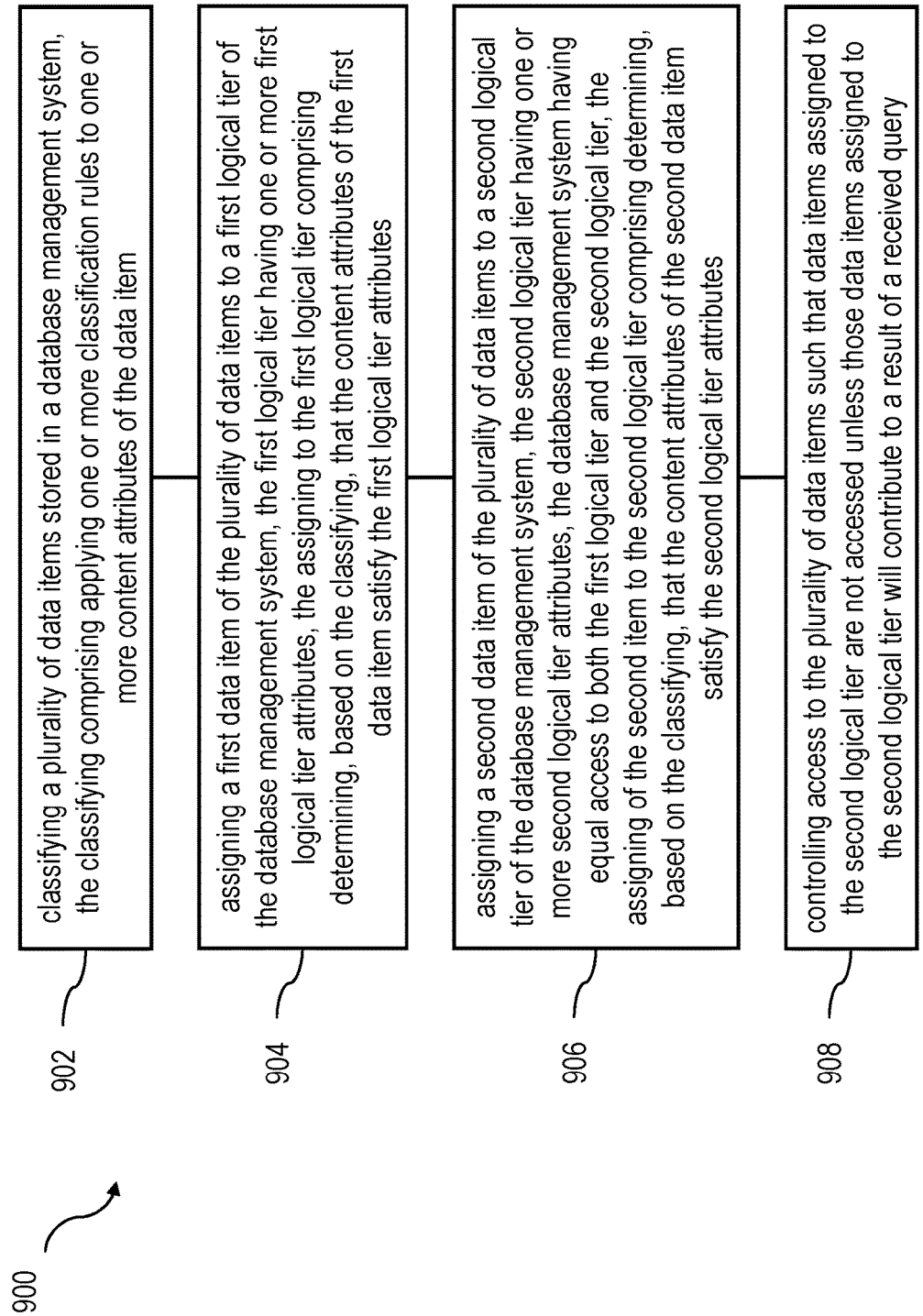
FIG. 9 is a process flow diagram illustrating a method having one or more features consistent with the presently described subject matter.

FIG. 9 is a process flow diagram 900 illustrating a method having one or more features consistent with the presently described subject matter.

At 902, a plurality of data items can be classified. The plurality of data items can be stored in a database management system. The classifying of the plurality of data items can comprise applying one or more classification rules to one or more content attributes of the data item. In some variations, the classifying can be performed by an application of the database management system.

At 904, a first data item, of the plurality of data items, can be assigned to a first logical tier of the database management system. The first logical tier can have one or more first logical tier attributes. The assigning of the first data item, of the plurality of data items, to the first logical tier can include determining, based on the classifying, that the content attributes of the first data item satisfy the first logical tier attributes.

In some variations, the first logical tier attributes can be such that they designate the first logical tier for storing data items that are classified as current. The second logical tier attributes can be such that they designate the second logical tier for storing data items that are classified as historical.

At 906, a second data item, of the plurality of data items, can be assigned to a second logical tier of the database management system. The second logical tier can have one or more second logical tier attributes. The database management system can have equal access to both the first logical tier and the second logical tier. The assigning of the second data item, of the plurality of data items, to the second logical tier can include determining, based on the classifying, that the content attributes of the second data item satisfy the second logical tier attributes.

At 908, access to the plurality of data items can be controlled. The controlling of the access to the plurality of data items can be such, that data items assigned to the second logical tier are not accessed unless those data items assigned to the second logical tier will contribute to a result of a received query. Controlling access to the plurality of data items can include applying implicit and explicit access controls. The implicit access control can include evaluating a condition specified in the received query against a statistical description of the second logical tier such that the second logical tier is not accessed if the statistics indicate no relevant data in the second tier. The explicit access control can include the received query that can include a clause that requests only current data to be accessed.

Figure 10:
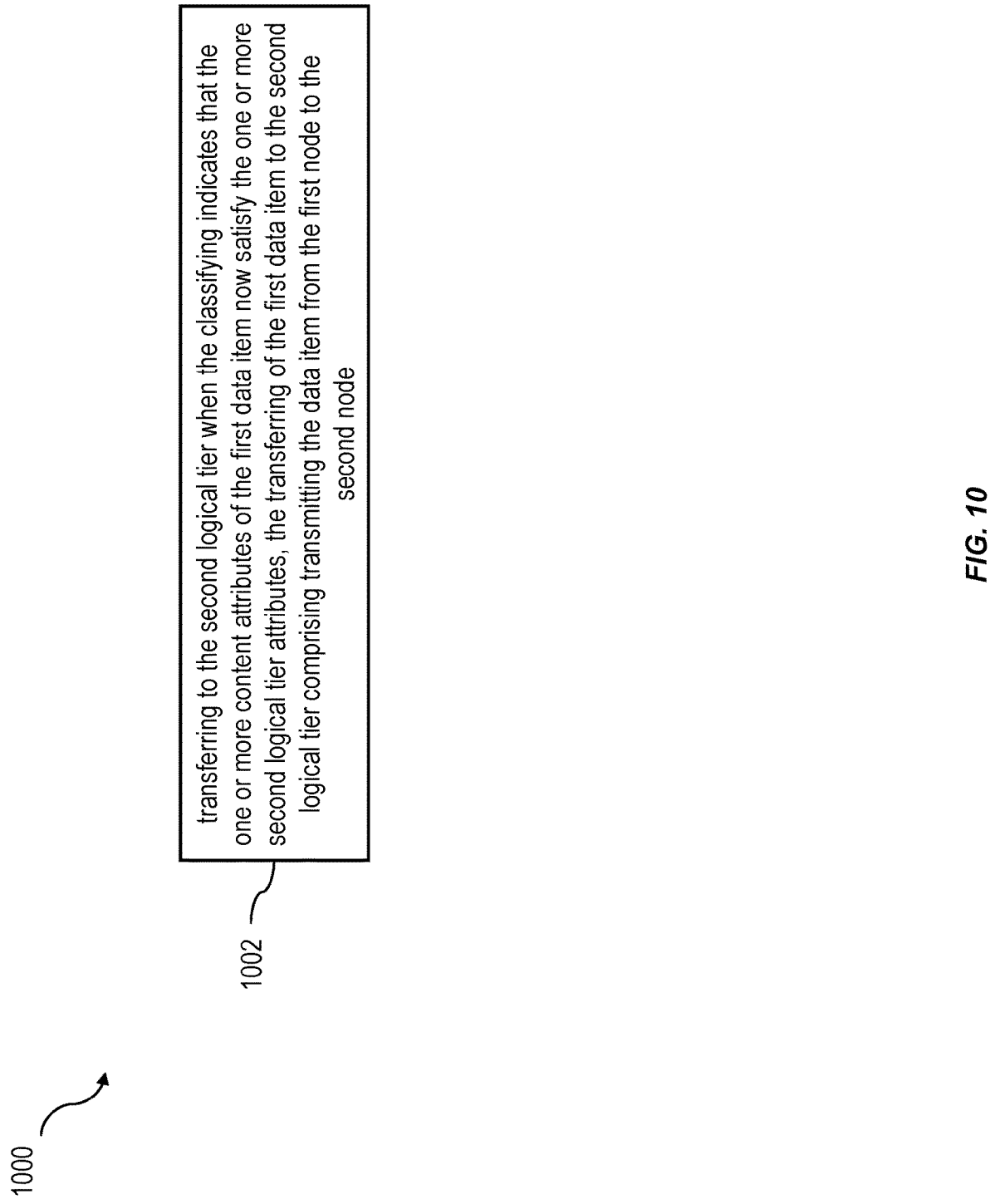
FIG. 10 is a process flow diagram illustrating a method having one or more features consistent with the presently described subject matter.

FIG. 10 is a process flow diagram illustrating a method 1000 having one or more features consistent with the presently described subject matter. In some variations, a first logical tier can be on a first node and the second logical tier can be on a second node.

At 1002, the first data item can be transferred to the second logical tier. The transferring can be performed when the classifying indicates that the one or more content attributes of the first data item now satisfy the one or more second logical tier attributes. The transferring of the first data item to the second logical tier can include transmitting the data item from the first node to the second node.

The first node can have a higher memory access rate compared to the second node. The second node can have a higher storage capacity at a smaller cost per storage volume than the first node. The first logical tier can be configured to have data items assigned to it that have a high level of relevance compared to the data items assigned to the second logical tier. The first logical tier can be stored on an in-memory storage medium and the second logical tier is stored on an on-disk storage medium.

The transferring of the first data item to the second logical tier can be performed when the classifying indicates that the one or more content attributes of the first data item now satisfy the one or more second logical tier attributes.

The first logical tier can be associated with a first partition. The transferring of the first data item, from the first logical tier to the second logical tier, can include moving at least the first data item from the first partition to a second partition. The second partition can be associated with the second logical tier.

The first logical tier can be associated with a first partition. The second partition can be associated with the second logical tier. The first logical tier can be transferred to the second logical tier when the classifying indicates that data items in the first partition now satisfy the one or more second logical tier attributes.

Figure 11:
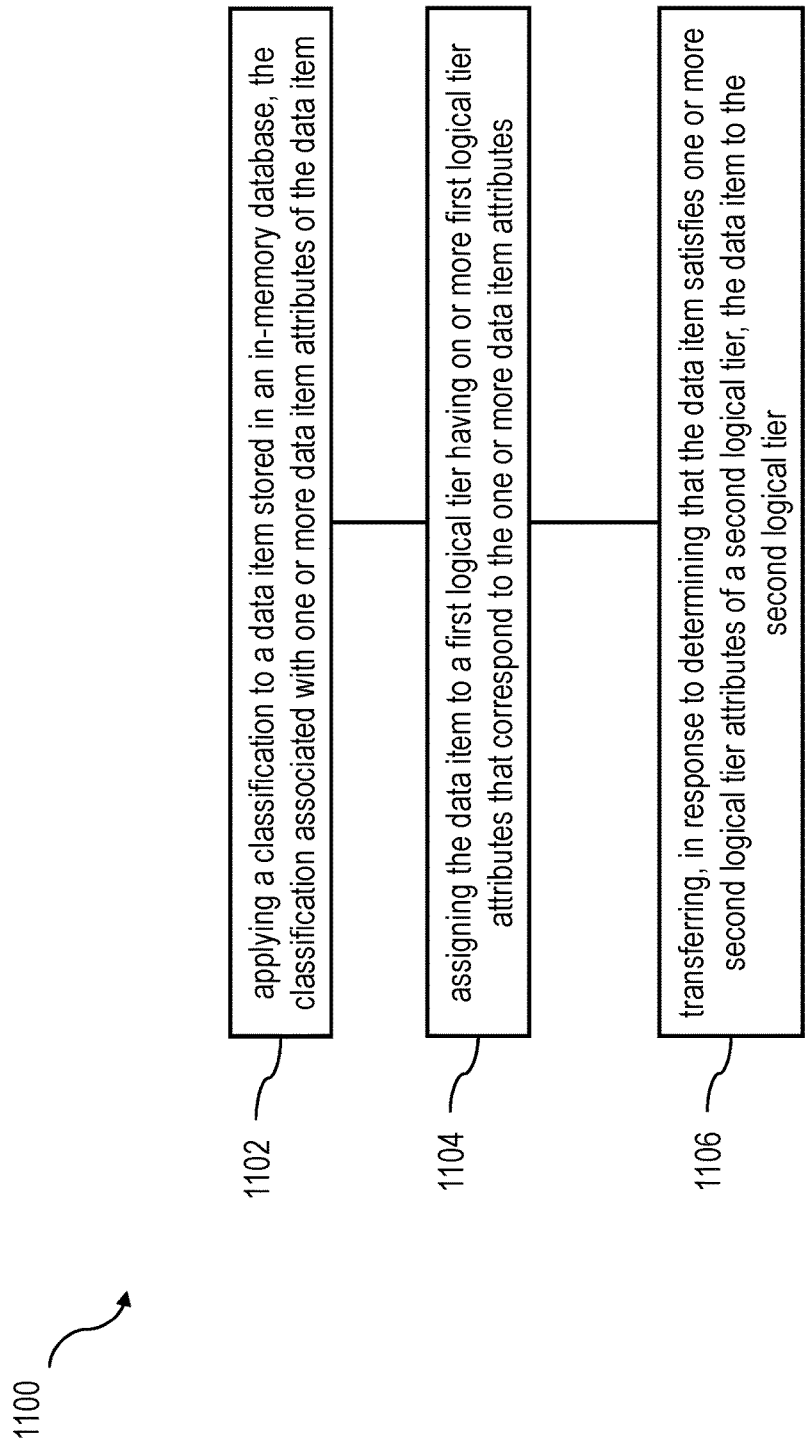
FIG. 11 is a process flow diagram illustrating a method having one or more features consistent with the presently described subject matter.

FIG. 11 is a process flow diagram illustrating a method 1100 having one or more features consistent with the presently described subject matter.

At 1102, a classification can be applied to a data item stored in an in-memory database. The classification can be associated with one or more data item attributes of the data item. For example, the data item may be an invoice having an invoice data of 2016. The classification assigned to the data item can include an indication that the data item is current due to its relatively recent status. Conversely, an invoice having an invoice data of 2006 may have a classification assigned to it that has an indication that the data item is historical due to its relatively old status. The one or more data item attributes can include a level of relevance of the data item. The level of relevance can be tied to whether the data item contains information associated with the current operations of an organization associated with the database. The level of relevance can be tied to whether the data item forms part of the current operational data for an organization associated with the database system.

At 1104, the data item can be assigned to a first logical tier. The first logical tier can have one or more first logical tier attributes that correspond with the one or more data item attributes. At least one partition can be associated with the first logical tier. The data item can be assigned to the first logical tier and a partition associated with the first logical tier. The first logical tier can and the partition associated with the first logical tier can be stored on a master node. The master node can be configured to have one or more attributes conducive to supporting storage and access of data that is current to the operational needs of an organization associated with a database.

At 1106, the data item can be transferred from the first logical tier to a second logical tier. The transferring can be in response to determining that the data item satisfies one or more second logical tier attributes of a second logical tier. The transfer can occur in response to an aging rule being executed. An aging rule can be dictated by a database application of a database system in which the data item is stored. An aging rule can cause data items that are no longer active data items to be transferred to a logical tier configured to store inactive data items. For example, the second logical tier can have one or more attributes conducive to facilitating the storage of data items that are not current to the operational needs of the organization associated with the database. The second logical tier can be stored on a historical node. A historical node can have hardware and/or software features configured to store data efficiently without he need for high-speed access to the data. Conversely, the first logical tier on the master node can have hardware and/or software features configured to store data that needs to have high-speed access.

In some variations, the data item may be stored in a partition. Transferring the data item from the first logical tier to the second logical tier can include transferring the entire partition from the first logical tier to the second logical tier. Transferring the whole partition can be more efficient than transferring individual data items. Furthermore, a partition can be transferred at a time when the database is being lightly used, for example, outside of normal business hours, or the like.

In some variations, one or more aging rules, dictated by one or more database applications, may provide an indication of the performance preferences for a data item. Performance preferences can include a minimum access-rate required for the data item, an indication of where the data item will be used, or the like. In response to the aging rules being executed, the database management system can be configured to choose a node that provides the required performance requirements for the data item. A database system can include various nodes that have different performance characteristics. Database nodes that have a high-level of performance can be more expensive to obtain and maintain, the per-byte cost of operating such nodes is relatively high. One example of such a high-performance node can include in-memory storage. Database nodes that have a low-level of performance can be less expensive to obtain and maintain, the per-by cost of operating such nodes can be relatively low. One example of a low-performance node can include on-disk memory storage. Low-performance nodes can be used to store large volumes of data relatively inexpensively. High-performance nodes can be used to store smaller volumes of operationally significant data.

Without in any way limiting the scope, interpretation, or application of the claims appearing herein, a technical effect of one or more of the example embodiments disclosed herein may include providing the upper architectural layers of the database management system at least one or more of the following features. The data lifecycle can be transparent to applications associated with the database management system. For example, once the relevant metadata is declared, the application can focus on the logic that it implements. The application can perform normal data access without concern for the data lifecycle. The database management system or system can be configured to avoid accessing physical layers that do not contribute to the results of the logic performed by the application on the database management system. The presently described subject matter provides a framework in which application specific functionality can be integrated, when transparency is not desired.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method, comprising:
repartitioning, by a database management system, a table having a first partition to include a second partition in addition to the first partition, the first partition of the table being stored in a first logical tier and the second partition of the table being stored in a second logical tier, the first logical tier being located on a first node configured to store and process queries on a first plurality of data items having a first logical tier attribute, the second logical tier being located on a second node configured to store a second plurality of data items having a second logical tier attribute, the table being repartitioned in response to one or more of the first plurality of data items in the first partition of the table satisfying the second logical tier attribute of the second logical tier, the repartitioning includes transferring, to the second logical tier, the one or more of the first plurality of data items satisfying the second logical tier attribute of the second logical tier, the first logical tier being associated with a first partition key and the second logical tier being associated with a second partition key, the first partition key and the second partition key being determined based at least on a time-correlated column in the table, and the database management system having equal access to the first logical tier and the second logical tier;
evaluating, at the first node, a condition specified in a query to determine that the first partition of the table satisfies the condition but the second partition of the table does not satisfy the condition, the condition being evaluated based at least on the first partition key and the second partition key; and
executing, based at least on the evaluating, the query, the query being executed at the first node by at least accessing the first logical tier based at least on the first partition of the table satisfying the condition specified in the query, and the query further being executed without accessing the second logical tier at the second node based at least on the second partition of the table not satisfying the condition specified in the query.

2. A method as in claim 1, wherein the first logical tier attribute designates the first logical tier for storing data items that are classified as current and the second logical tier attribute designates the second logical tier for storing data items that are classified as historical.

3. The method of claim 1, wherein the first node has a higher memory access rate compared to the second node and the second node has a higher storage capacity at a smaller cost per storage volume than the first node.

4. The method of claim 1, wherein the first logical tier attribute designates the first logical tier for storing data items having a first level of relevance, and wherein the second logical tier attribute designates the second logical tier for storing data items having a second level of relevance that is lower than the first level of relevance.

5. The method of claim 1, wherein the first node comprises an in-memory storage medium, and wherein the second node comprises an on-disk storage medium.

6. The method of claim 1, wherein the repartitioning is performed by an application of the database management system.

7. The method of claim 1, wherein the first node comprises a master node configured to execute the query, and wherein the second node comprises a storage node configured to store the second plurality of data items.

8. A system, comprising:
at least one processor; and
at least one memory configured to store computer readable instructions which, when executed by the at least one processor, cause the at least one processor to perform one or more operations, the one or more operations comprising:
repartitioning, by a database management system, a table having a first partition to include a second partition in addition to the first partition, the first partition of the table being stored in a first logical tier and the second partition of the table being stored in a second logical tier, the first logical tier being located on a first node configured to store and process queries on a first plurality of data items having a first logical tier attribute, the second logical tier being located on a second node configured to store a second plurality of data items having a second logical tier attribute, the table being repartitioned in response to one or more of the first plurality of data items in the first partition of the table satisfying the second logical tier attribute of the second logical tier, the repartitioning includes transferring, to the second logical tier, the one or more of the first plurality of data items satisfying the second logical tier attribute of the second logical tier, the first logical tier being associated with a first partition key and the second logical tier being associated with a second partition key, the first partition key and the second partition key being determined based at least on a time-correlated column in the table, and the database management system having equal access to the first logical tier and the second logical tier;
evaluating, at the first node, a condition specified in a query to determine that the first partition of the table satisfies the condition but the second partition of the table does not satisfy the condition, the condition being evaluated based at least on the first partition key and the second partition key; and executing, based at least on the evaluating, the query, the query being executed at the first node by at least accessing the first logical tier based at least on the first partition of the table satisfying the condition specified in the query, and the query further being executed without accessing the second logical tier at the second node based at least on the second partition of the table not satisfying the condition specified in the query.

9. A system as in claim 8, wherein the first logical tier attribute designates the first logical tier for storing data items that are classified as current and the second logical tier attribute designates the second logical tier for storing data items that are classified as historical.

10. The system of claim 8, wherein the first node has a higher memory access rate compared to the second node and the second node has a higher storage capacity at a smaller cost per storage volume than the first node.

11. The system of claim 8, wherein the first logical tier attribute designates the first logical tier for storing data items having a first level of relevance, and wherein the second logical tier attribute designates the second logical tier for storing data items having a second level of relevance that is lower than the first level of relevance.

12. The system of claim 8, wherein the first node comprises an in-memory storage medium, and wherein the second node comprises an on-disk storage medium.

13. The system of claim 8, wherein the repartitioning is performed by an application of the database management system.

\* \* \* \* \*

UNITED STATES PATENT AND TRADEMARK OFFICE
CERTIFICATE OF CORRECTION

PATENT NO. : 10,885,062 B2  
APPLICATION NO. : 15/361337  
DATED : January 5, 2021  
INVENTOR(S) : Mihnea Andrei et al.

Page 1 of 1

It is certified that error appears in the above-identified patent and that said Letters Patent is hereby corrected as shown below:

On the Title Page

Please replace the following in the Inventors section:
"Inventors: Mihnea Andrei, Issy les Moulineaux (FR);
 Christian Bensberg, Heidelberg (DE);
 Alexander Boehm, Sandhausen (DE);
 Adrian Dragusanu, Walldorf (DE);
 Xun Chen, Walldorf (DE);
 Reza Sherkat, Ontario (CA);
 Anisoara Nica, Walldorf (DE);
 Martin Heidel, Walldorf (DE);
 Rolando Blanco, Ontario (CA)"

With:
"Inventors: Mihnea Andrei, Issy les Moulineaux (FR);
 Christian Bensberg, Heidelberg (DE);
 Alexander Boehm, Sandhausen (DE);
 Adrian Dragusanu, Walldorf (DE);
 Xun Cheng, Dublin, CA, USA;
 Reza Sherkat, Ontario (CA);
 Anisoara Nica, Walldorf (DE);
 Martin Heidel, Walldorf (DE);
 Rolando Blanco, Ontario (CA)"

Signed and Sealed this
Nineteenth Day of July, 2022

Katherine Kelly Vidal
*Director of the United States Patent and Trademark Office*